United States Patent Office 2,698,119
Patented Dec. 28, 1954

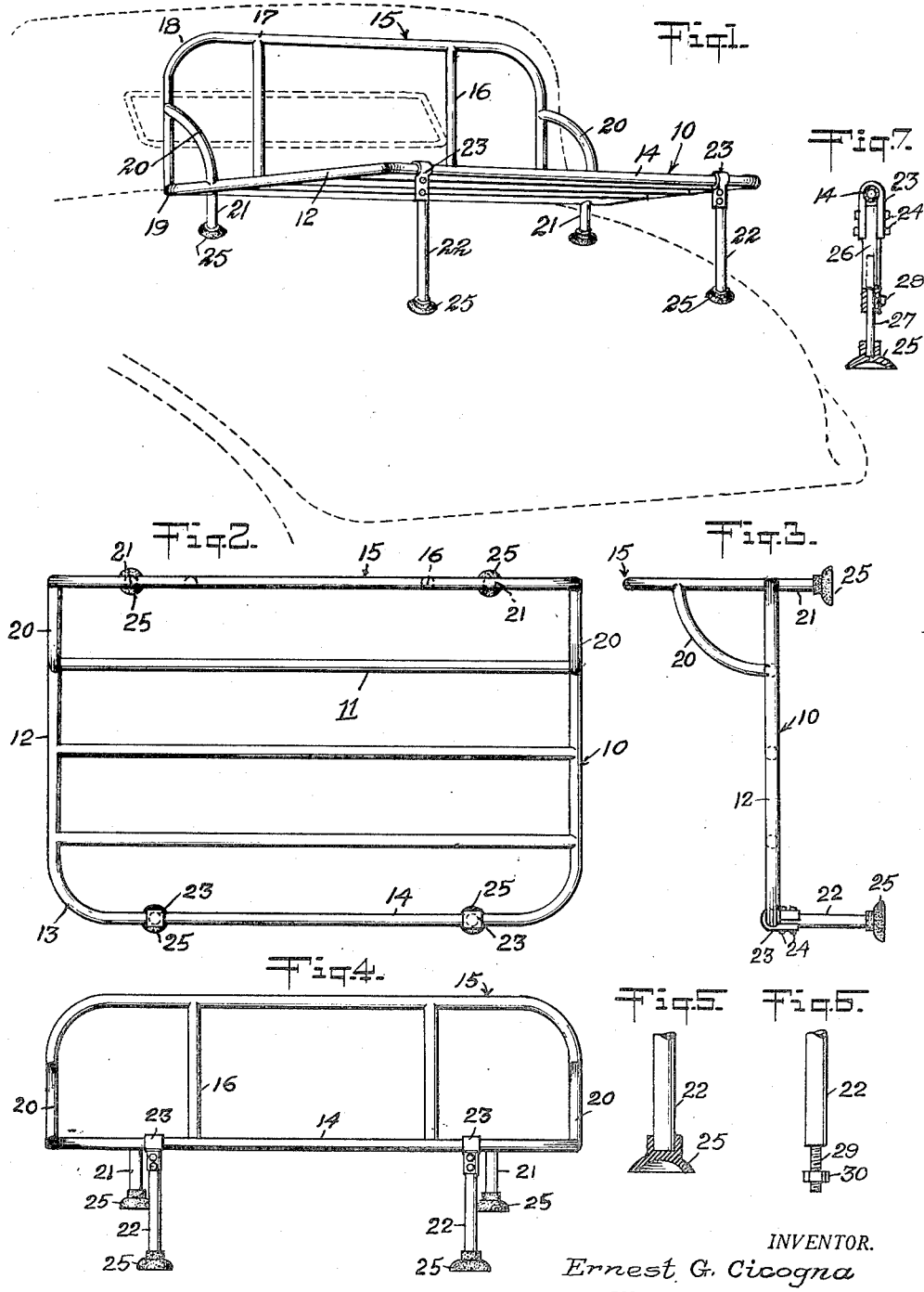

2,698,119

LUGGAGE CARRIER

Ernest G. Cicogna, New York, N. Y.

Application May 18, 1950, Serial No. 162,778

2 Claims. (Cl. 224—42.43)

This invention relates to a rack or luggage carrier for automobiles.

An object of this invention is to provide a rack which can be accommodated to the curvature of the rear portion of an automobile to which it is affixed.

Another object of this invention is to provide a rack which can be affixed to the rear portion of an automobile without marring the surface thereof.

A further object of the invention is to provide an automobile rack of such construction that side sway of large objects placed thereon for carriage is minimized.

A still further object of the invention is to provide a luggage carrier so constructed that it slopes towards the front of the automobile, thus causing objects placed thereon to settle against the guard portion of said rack, minimizing the displacement of luggage or other objects placed on said luggage carrier.

With these and other objects in view, the invention consists in certain novel features of construction and combination which will be more fully hereinafter described and pointed out in the claims.

In the accompanying drawing—

Figure 1 is a perspective view of the luggage carrier showing in dotted lines a rear view of the automobile on which the luggage rack is placed;

Fig. 2 is a plan view;

Fig. 3 is a side view;

Fig. 4 is an end view;

Fig. 5 is a detailed view of the lower portion of one of the legs of the luggage carrier showing a cross sectional view of the suction cup on the bottom thereof;

Fig. 6 is a detailed view of the lower portion of a modified form of the legs of the luggage carrier;

Fig. 7 is a detailed view of one of the legs of the luggage carrier in an extended or lengthened position.

Referring to the accompanying drawing by numerals, 10 indicates the platform of the luggage carrier, comprising cross bars 11 affixed to an outside frame 12, having curved portions 13 and a rear portion 14. 15 indicates the front guard of the luggage carrier comprising vertical bars 16 and a vertical frame 17, having curved portions 18. The vertical bars 16 are affixed to the vertical frame 17 and the platform 10, and the vertical frame 17 is affixed to the outside frame 12 of the platform 10 at 19. Side guards 20 are affixed to the outside frame 12 and the vertical frame 17, and act as supports therefor in addition to their function, as shown below, of minimizing side sway of objects carried on the luggage carrier. Front legs 21 are attached to the outside frame 12. The rear legs 22 are attached to the outside frame 12 of the platform 10 by means of the strap 23 and the nuts, front legs 21 and the rear legs 22. The rear legs 22 consist of a sleeve 26 and a shank 27 slidably mounted therein. The length of the rear legs 22 can be adjusted by the telescoping of the shank 27 into the sleeve 26, or the withdrawal of the shank 27 from the sleeve 26, and the desired length of the rear legs 22 may be fixed by means of the set screw 28.

As shown in Fig. 6, a modified form of the invention provides for a threaded shank 29 at the bottom of the legs 21 and 22 in place of the suction cups 25. With this threaded shank 29 there is provided a nut 30.

In operation, the straps 23, by which the rear legs 22 are mounted on the outside frame 12, are loosened by the turning of the nuts and bolts 24. This allows the rear legs 22 to be moved nearer or farther away from each other along the front portion 14 of the outside frame 12 or along the curved portion 13 of outside frame 12 in order that the suction cups may find a secure seating despite the curvature of the rear portion of the particular automobile on which the luggage carrier is to be mounted.

The forward slope of the platform 10 of the luggage carrier can be controlled by the length of the rear legs 22. This length can be adjusted by telescoping the shank 27 into the sleeve 26 or withdrawing this shank from the sleeve 26. After the desired length is determined, it can be fixed by tightening the set screw 28. Not only can the forward slope of the platform be controlled by the length of the legs 22, but the ability to adjust the length of these legs provides means to more securely seat the suction cups depending upon the curvature of the rear portion of the particular automobile on which the luggage carrier is to be mounted.

After the rear legs 22 have been secured at the desired points on the outside frame 12 of the platform 10, and these rear legs have been adjusted lengthwise, the luggage carrier is then mounted on the rear portion of the automobile. The suction cups 25 prevent the movement of the luggage carrier. Luggage or other objects are then placed on the luggage carrier. The slope of the bottom platform 10 towards the front of the automobile minimizes the possibility of the luggage or other objects being carried from slipping off the rear portion of the luggage carrier, and the side guards 20 prevent the luggage from swaying sideways. The luggage or other objects may also be strapped to the luggage carrier for further security.

It will be seen that the construction of the luggage carrier is such that a trunk or other object too large to fit into the inside compartment of the automobile may be mounted and carried on the luggage carrier. Additionally, by reason of the particular construction of this luggage carrier, the object carried thereon may be easily placed on the luggage carrier or removed therefrom merely by sliding it onto or off the luggage carrier.

If it is desired to permanently affix the luggage carrier to the rear portion of the automobile, the modified form of legs—as shown in Fig. 6—may be used. Where so used, holes are drilled at the required places on the automobile and the threaded portions 29 of the legs 21 and 22 are inserted therethrough after the nuts 30 have been removed from such threaded portions. These nuts 30 are then screwed onto the threaded portion 29, securely fastening the legs to the automobile.

While the invention has been described in detail with respect to a present preferred form which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of any one or more of the appended claims.

I claim:

1. A luggage carrier for automobiles comprising a platform having cross bars and an outside frame, a front guard having vertical bars and a vertical frame, side guards connected to said outside frame and said vertical frame, a pair of front and rear legs, each leg having a suction cup on the bottom thereof, said rear legs comprising a sleeve, a shank within said sleeve and a set screw to adjust said shank and sleeve, and straps connecting the rear legs to the outside frame so that said rear legs are both rotatably and slidably adjustable with respect to said outside frame.

2. A luggage carrier for automobiles comprising a platform having cross bars and an outside frame, a vertical front guard, side guards connected to said outside frame and said front guard, a pair of front legs and a pair of rear legs, each of said legs having a suction cup on the bottom thereof, each rear leg being slidably and rotatably connected to said outside frame by means of an adjustable U-shaped strap and each said rear leg comprising a shank, a sleeve and a set screw for adjustment of said shank within said sleeve so that said rear legs are adapted for horizontal, angular and vertical adjustment so that the luggage carrier may be accommodated to the curvature of the rear portion of the particular automobile to which it is to be affixed and so the platform of said luggage carrier may be caused to slope forward at the desired angle.

References Cited in the file of this patent

UNITED STATES PATENTS

| Number | Name | Date |
|---|---|---|
| 1,249,338 | Crawford | Dec. 11, 1917 |
| 1,712,836 | Mills | May 14, 1929 |
| 1,798,340 | Thewes | Mar. 31, 1931 |
| 2,009,721 | Williams | July 30, 1935 |
| 2,338,092 | Brown | Jan. 4, 1944 |
| 2,440,821 | Godwin | May 4, 1948 |
| 2,594,319 | Law | Apr. 29, 1952 |

FOREIGN PATENTS

| Number | Country | Date |
|---|---|---|
| 216,092 | Switzerland | Nov. 17, 1941 |
| 104,715 | Sweden | June 9, 1942 |
| 947,723 | France | Jan. 17, 1949 |
| 951,852 | France | Apr. 18, 1949 |